(12) United States Patent
Yum et al.

(10) Patent No.: US 9,172,122 B2
(45) Date of Patent: *Oct. 27, 2015

(54) BATTERY MODULE

(71) Applicant: LG Chem, Ltd., Seoul (KR)

(72) Inventors: Juil Yum, Ann Arbor, MI (US); Sung Kyun Chang, Troy, MI (US); Heekook Yang, Troy, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/189,071

(22) Filed: Feb. 25, 2014

(65) Prior Publication Data

US 2015/0244043 A1    Aug. 27, 2015

(51) Int. Cl.
*H01M 2/30* (2006.01)
*H01M 10/6554* (2014.01)
*H01M 10/613* (2014.01)
*H01M 10/6551* (2014.01)
*H01M 2/10* (2006.01)
*H01M 2/20* (2006.01)
(Continued)

(52) U.S. Cl.
CPC ........ *H01M 10/6554* (2015.04); *H01M 2/0237* (2013.01); *H01M 2/1077* (2013.01); *H01M 2/206* (2013.01); *H01M 2/30* (2013.01); *H01M 10/613* (2015.04); *H01M 10/647* (2015.04); *H01M 10/6551* (2015.04); *H01M 2220/20* (2013.01)

(58) Field of Classification Search
CPC ..... H01M 2/30; H01M 2/1077; H01M 2/206; H01M 2220/20
See application file for complete search history.

(56) References Cited

U.S. PATENT DOCUMENTS 6,905,790 B2    6/2005  Benson et al.
8,263,249 B2 *  9/2012  Yoon .............................. 429/99
8,501,345 B2    8/2013  Gardner et al.
(Continued)

FOREIGN PATENT DOCUMENTS

JP    2006185713    7/2006
KR    20070025390   3/2007
(Continued)

OTHER PUBLICATIONS

U.S. Appl. No. 14/046,107, filed Oct. 4, 2013 entitled Battery Module and Battery Cell.
(Continued)

*Primary Examiner* — Stewart Fraser
(74) *Attorney, Agent, or Firm* — Buckert Patent & Trademark Law Firm, PC; John F. Buckert (57) ABSTRACT

A battery module includes a first battery cell having a first housing and first and second electrical terminals. The first housing has first, second, third and fourth ends. The first and second electrical terminals extend outwardly from the third and fourth ends, respectively. A distance from the second end of the first housing to a second edge of the first electrical terminal is greater than a distance from the first end of the first housing to a first edge of the first electrical terminal. A distance from the second end of the first housing to a second edge of the second electrical terminal is greater than a distance from the first end of the first housing to a first edge of the second electrical terminal. The battery module further includes a cooling fin disposed adjacent to the first battery cell, and a cooling plate coupled to the cooling fin.

14 Claims, 5 Drawing Sheets

(51) Int. Cl.
*H01M 10/647* (2014.01)
*H01M 2/02* (2006.01)

(56) References Cited

U.S. PATENT DOCUMENTS

| | | | |
|---|---|---|---|
| 8,557,422 B2* | 10/2013 | Yoo et al. | 429/94 |
| 9,024,572 B2* | 5/2015 | Nishihara et al. | 320/107 |
| 2014/0050953 A1* | 2/2014 | Yoon et al. | 429/82 |
| 2015/0079455 A1* | 3/2015 | Chang et al. | 429/159 |
| 2015/0086845 A1* | 3/2015 | Chang et al. | 429/159 |

FOREIGN PATENT DOCUMENTS

| | | |
|---|---|---|
| KR | 20070033983 | 3/2007 |
| KR | 20080011477 | 2/2008 |
| KR | 20110013269 | 2/2011 |
| KR | 20110023778 | 3/2011 |
| KR | 20120016590 | 2/2012 |
| KR | 20090016279 | 2/2013 |
| KR | 20130062543 | 6/2013 |
| KR | 20130125341 | 11/2013 |
| KR | 20130126044 | 11/2013 |
| KR | 20130137299 | 12/2013 |

OTHER PUBLICATIONS

U.S. Appl. No. 14/050,797, filed Oct. 10, 2013 entitled Battery Module and Battery Cell.

* cited by examiner

BATTERY MODULE

BACKGROUND

The inventors herein have recognized a need for a battery module having a battery cell with an improved placement of electrical terminals thereon that allows for an improved placement of electrical devices such as interconnect boards and wire harnesses thereon to maximize a battery system energy density by decreasing the unusable space of the battery system. The inventors herein have further recognized that disposing the battery cell on a cooling plate such that the electrical terminals thereof are disposed proximate to the cooling plate, results in an improved dissipation of heat energy from the battery module.

SUMMARY

A battery module in accordance with an exemplary embodiment is provided. The battery module includes a first battery cell having a first housing and first and second electrical terminals. The first housing is substantially rectangular-shaped and extends longitudinally along a first axis and vertically along a second axis. The second axis is substantially perpendicular to the first axis. The first housing has first, second, third and fourth ends. The first and second ends extend substantially parallel to the first axis. The third and fourth ends extend substantially parallel to the second axis. A combined length of the first housing and the first and second electrical terminals in a direction parallel to the first axis is at least two times larger than a length of the first housing in a direction parallel to the second axis. The first electrical terminal extends outwardly from the third end of the first housing in a direction substantially parallel to the first axis. The first electrical terminal has first and second edges extending substantially parallel to the first axis. The first edge of the first electrical terminal is disposed closer to the first end of the first housing than the second edge of the first electrical terminal. A distance from the second end of the first housing to the second edge of the first electrical terminal is greater than a distance from the first end of the first housing to the first edge of the first electrical terminal. The second electrical terminal extends outwardly from the fourth end of the first housing in a direction substantially parallel to the first axis. The second electrical terminal has first and second edges extending substantially parallel to the first axis. The first edge of the second electrical terminal is disposed closer to the first end of the first housing than the second edge of the second electrical terminal. A distance from the second end of the first housing to the second edge of the second electrical terminal is greater than a distance from the first end of the first housing to the first edge of the second electrical terminal. The battery module further includes a cooling fin having a first side disposed adjacent to and against the first housing of the first battery cell. The battery module further includes a cooling plate coupled to the cooling fin proximate to the first end of the first housing such that the cooling plate cools the cooling fin to reduce a temperature level of the first battery cell.

DETAILED DESCRIPTION

Referring to FIGS. 1-4, a battery module 10 in accordance with an exemplary embodiment is illustrated. An advantage of the battery module 10 is that the battery module 10 has an improved placement of electrical terminals such that the battery module has open regions 110, 120 for receiving interconnect boards 100, 102 therein. Thus, the battery module 10 has an improved structural configuration that is more easily placed within an electric vehicle. Further, the battery module 10 utilizes a cooling plate 124 disposed proximate to electrical terminals in the battery module 10 for improved heat dissipation from battery cells in the battery module 10. The battery module 10 includes frame members 20, 22, 24, 26, 28, 30, 32, 34, battery cells 50, 52, 54, 56, 58, 60, 62, 64, 66, 68, 70, 72, 74, 76, 78, 80, interconnect boards 100, 102, cooling fins 106, 108, 110, 112, 114, 116, 118, 120, and a cooling plate 124.

The frame members 20-34 are configured to hold the battery cells therein. In an exemplary embodiment, the frame members 20-34 are constructed of plastic. Further, each of the frame members 20-34 has an identical structure to one another.

Figure 2:
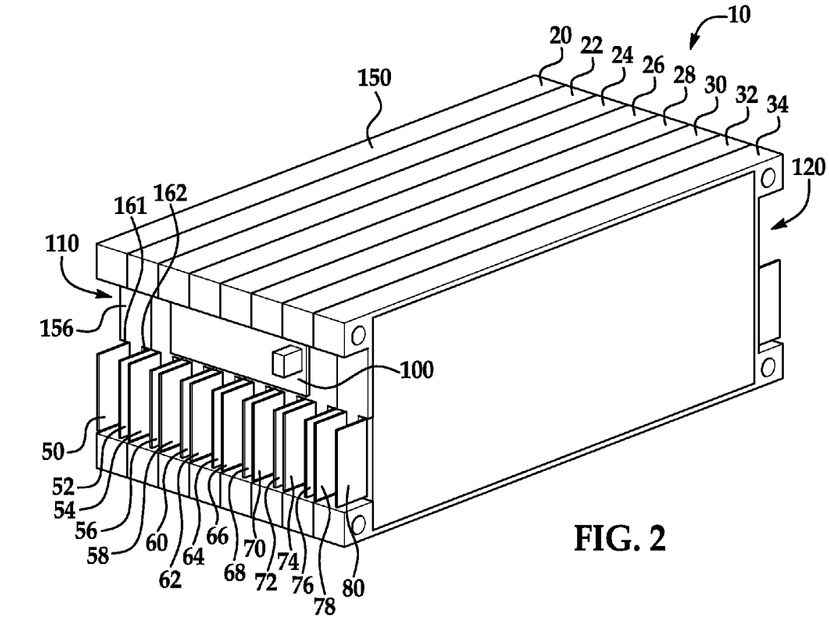
FIG. 2 is a schematic of a portion of the battery module of FIG. 1.
Figure 3:
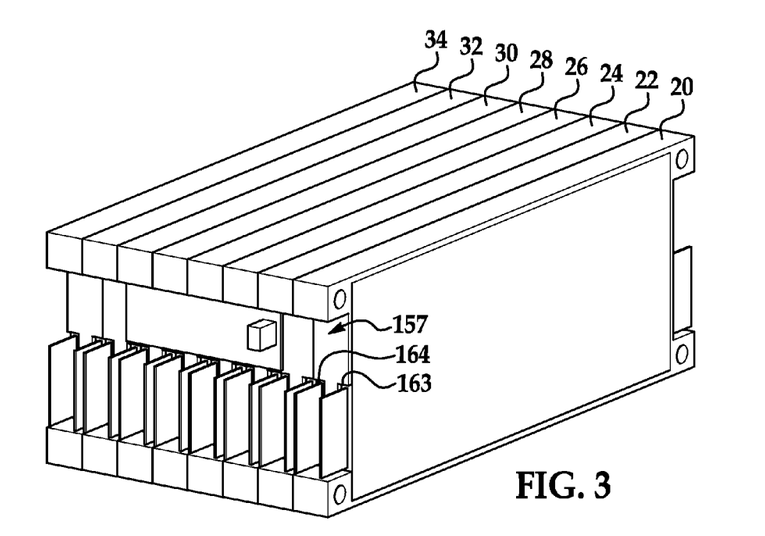
FIG. 3 is a schematic of another portion of the battery module of FIG. 1.
Figure 4:
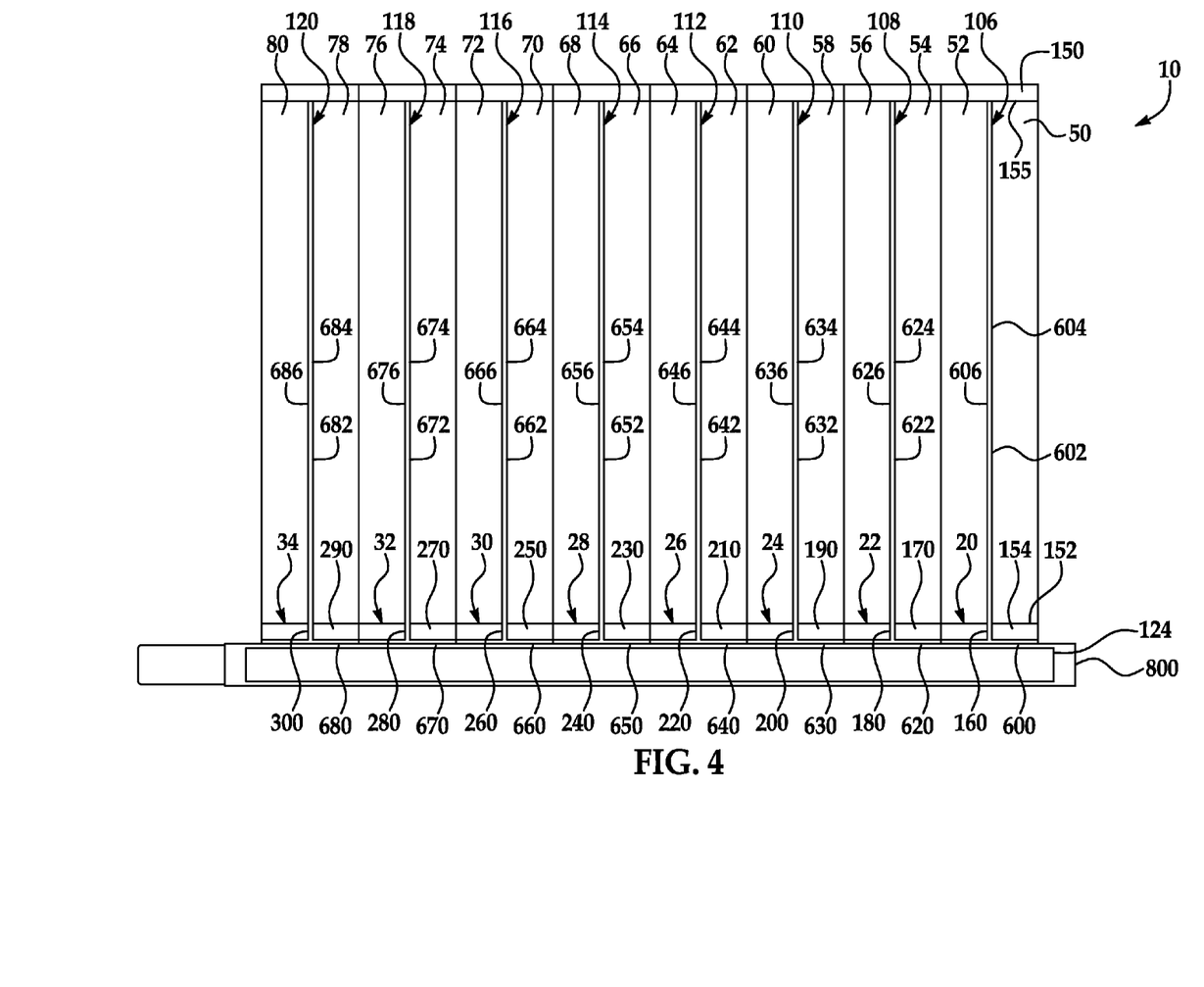
FIG. 4 is a cross-sectional schematic of the battery module of FIG. 1.
Figure 5:
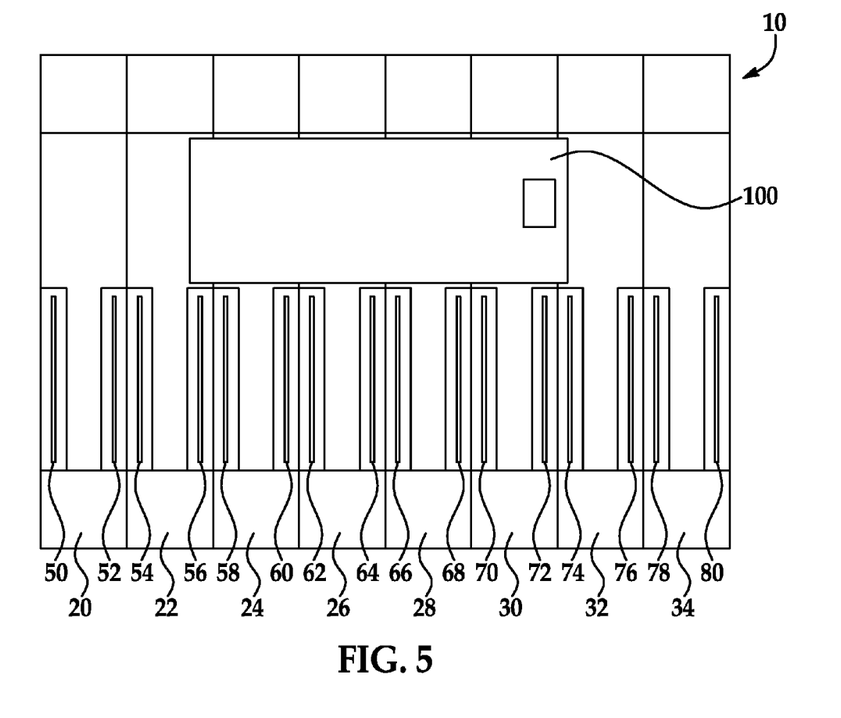
FIG. 5 is a side view of the battery module of FIG. 1.

Referring to FIGS. 2-4, the frame member 20 includes a peripheral wall 150 defining an interior region 152. In an exemplary embodiment, the peripheral wall 150 is substantially rectangular ring-shaped. The peripheral wall 150 includes first, second, third, fourth, wall portions 154, 155, 156 (shown in FIG. 2), 157 (shown in FIG. 3). The wall portions 154, 155 extend substantially parallel to one another. Further, the wall portions 156, 157 extend substantially parallel to one another and perpendicular to the wall portions 154, 155. The peripheral wall 150 includes an aperture 160 (shown in FIG. 4) extending through the wall portion 154 for receiving a portion of the cooling fin 106 therethrough. The wall portion 156 includes grooves 161, 162 (shown in FIG. 3) extending therethrough for receiving electrical terminals therethrough, and the wall portion 157 includes grooves 163, 164 extending therethrough for receiving electrical terminals therethrough.

Referring to FIGS. 2 and 4, the frame member 22 includes a peripheral wall 170 defining an interior region. In an exemplary embodiment, the peripheral wall 170 is substantially rectangular ring-shaped. Further, the peripheral wall 170 includes an aperture 180 for receiving a portion of the cooling fin 108 therethrough. The frame member 22 is coupled to and between the frame members 20, 24.

The frame member 24 includes a peripheral wall 190 defining an interior region. In an exemplary embodiment, the peripheral wall 190 is substantially rectangular ring-shaped. Further, the peripheral wall 190 includes an aperture 200 for receiving a portion of the cooling fin 110 therethrough. The frame member 24 is coupled to and between the frame members 22, 26.

The frame member 26 includes a peripheral wall 210 defining an interior region. In an exemplary embodiment, the peripheral wall 210 is substantially rectangular ring-shaped. Further, the peripheral wall 210 includes an aperture 220 for receiving a portion of the cooling fin 112 therethrough. The frame member 26 is coupled to and between the frame members 24, 28.

The frame member 28 includes a peripheral wall 230 defining an interior region. In an exemplary embodiment, the peripheral wall 230 is substantially rectangular ring-shaped. Further, the peripheral wall 230 includes an aperture 240 for receiving a portion of the cooling fin 114 therethrough. The frame member 28 is coupled to and between the frame members 26, 30.

The frame member 30 includes a peripheral wall 250 defining an interior region. In an exemplary embodiment, the peripheral wall 250 is substantially rectangular ring-shaped. Further, the peripheral wall 250 includes an aperture 260 for receiving a portion of the cooling fin 116 therethrough. The frame member 30 is coupled to and between the frame members 28, 32.

The frame member 32 includes a peripheral wall 270 defining an interior region. In an exemplary embodiment, the peripheral wall 270 is substantially rectangular ring-shaped. Further, the peripheral wall 270 includes an aperture 280 for receiving a portion of the cooling fin 118 therethrough. The frame member 32 is coupled to and between the frame members 30, 34.

The frame member 34 includes a peripheral wall 290 defining an interior region. In an exemplary embodiment, the peripheral wall 290 is substantially rectangular ring-shaped. Further, the peripheral wall 290 includes an aperture 300 for receiving a portion of the cooling fin 120 therethrough. The frame member 34 is coupled to the frame member 32.

Figure 1:
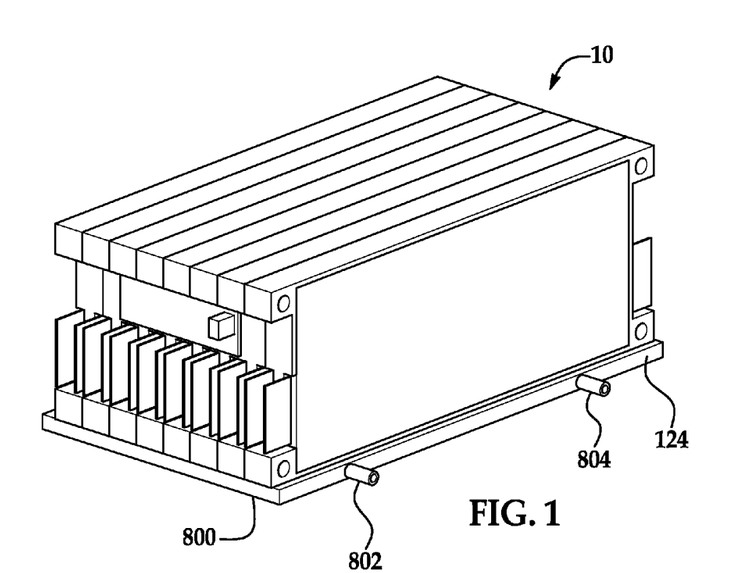
FIG. 1 is a schematic of a battery module in accordance with an exemplary embodiment.

Referring to FIGS. 1 and 4, the cooling fins 106, 108, 112, 114, 116, 118, 120 provided to transfer heat energy from the battery cells to the cooling plate 124. In an exemplary embodiment, each of the cooling fins 106-120 has an identical structure to one another. Further, each of the cooling fins 106-120 is constructed of a thermally conductive material, such as aluminum, copper, or steel, for example.

The cooling fin 106 includes a first sheet portion 600 and a second sheet portion 602. The first sheet portion 600 is coupled to an end of the second sheet portion 602 and extends substantially perpendicular to the second sheet portion 602. A cross-sectional profile of the first sheet portion 600 and the second sheet portion 602 is substantially T-shaped. The second sheet portion 602 is disposed through an aperture 160 of the frame member 20 and into the interior region 152 of the frame member 20. The first sheet portion 600 is disposed on the cooling plate 124. The second sheet portion 602 includes a first side 604 and a second side 606 disposed opposite to the first side 604. The battery cell 50 is disposed against the first side 604 within the interior region 152 of the frame member 20. The battery cell 52 is disposed against the second side 606 within the interior region 152 of the frame member 20. The cooling fin 106 transfers heat energy from the battery cells 50, 52 to the cooling plate 124.

The cooling fin 108 includes a first sheet portion 620 and a second sheet portion 622. The first sheet portion 620 is coupled to an end of the second sheet portion 622 and extends substantially perpendicular to the second sheet portion 622. A cross-sectional profile of the first sheet portion 620 and the second sheet portion 622 is substantially T-shaped. The second sheet portion 622 is disposed through an aperture 180 of the frame member 22 and into the interior region of the frame member 22. The first sheet portion 620 is disposed on the cooling plate 124. The second sheet portion 622 includes a first side 624 and a second side 626 disposed opposite to the first side 624. The battery cell 54 is disposed against the first side 624 within the interior region of the frame member 22. The battery cell 56 is disposed against the second side 626 within the interior region of the frame member 22. The cooling fin 108 transfers heat energy from the battery cells 54, 56 to the cooling plate 124.

The cooling fin 110 includes a first sheet portion 630 and a second sheet portion 632. The first sheet portion 630 is coupled to an end of the second sheet portion 632 and extends substantially perpendicular to the second sheet portion 632. A cross-sectional profile of the first sheet portion 630 and the second sheet portion 632 is substantially T-shaped. The second sheet portion 632 is disposed through an aperture 200 of the frame member 24 and into the interior region of the frame member 24. The first sheet portion 630 is disposed on the cooling plate 124. The second sheet portion 632 includes a first side 634 and a second side 636 disposed opposite to the first side 634. The battery cell 58 is disposed against the first side 634 within the interior region of the frame member 24. The battery cell 60 is disposed against the second side 636 within the interior region of the frame member 24. The cooling fin 110 transfers heat energy from the battery cells 58, 60 to the cooling plate 124.

The cooling fin 112 includes a first sheet portion 640 and a second sheet portion 642. The first sheet portion 640 is coupled to an end of the second sheet portion 642 and extends substantially perpendicular to the second sheet portion 642. A cross-sectional profile of the first sheet portion 640 and the second sheet portion 642 is substantially T-shaped. The second sheet portion 642 is disposed through an aperture 220 of the frame member 26 and into the interior region of the frame member 26. The first sheet portion 640 is disposed on the cooling plate 124. The second sheet portion 642 includes a first side 644 and a second side 646 disposed opposite to the first side 644. The battery cell 62 is disposed against the first side 644 within the interior region of the frame member 26. The battery cell 64 is disposed against the second side 646 within the interior region of the frame member 26. The cooling fin 112 transfers heat energy from the battery cells 62, 64 to the cooling plate 124.

The cooling fin 114 includes a first sheet portion 650 and a second sheet portion 652. The first sheet portion 650 is coupled to an end of the second sheet portion 652 and extends substantially perpendicular to the second sheet portion 652. A cross-sectional profile of the first sheet portion 650 and the second sheet portion 652 is substantially T-shaped. The second sheet portion 652 is disposed through an aperture 240 of the frame member 28 and into the interior region of the frame member 28. The first sheet portion 650 is disposed on the cooling plate 124. The second sheet portion 652 includes a first side 654 and a second side 656 disposed opposite to the first side 654. The battery cell 66 is disposed against the first side 654 within the interior region of the frame member 28. The battery cell 68 is disposed against the second side 656 within the interior region of the frame member 28. The cooling fin 114 transfers heat energy from the battery cells 66, 68 to the cooling plate 124.

The cooling fin 116 includes a first sheet portion 660 and a second sheet portion 662. The first sheet portion 660 is coupled to an end of the second sheet portion 662 and extends substantially perpendicular to the second sheet portion 662. A cross-sectional profile of the first sheet portion 660 and the second sheet portion 662 is substantially T-shaped. The second sheet portion 662 is disposed through an aperture 260 of the frame member 30 and into the interior region of the frame member 30. The first sheet portion 660 is disposed on the cooling plate 124. The second sheet portion 662 includes a first side 664 and a second side 666 disposed opposite to the first side 664. The battery cell 70 is disposed against the first side 664 within the interior region of the frame member 30. The battery cell 72 is disposed against the second side 666 within the interior region of the frame member 30. The cooling fin 116 transfers heat energy from the battery cells 70, 72 to the cooling plate 124.

The cooling fin 118 includes a first sheet portion 670 and a second sheet portion 672. The first sheet portion 670 is coupled to an end of the second sheet portion 672 and extends substantially perpendicular to the second sheet portion 672. A cross-sectional profile of the first sheet portion 670 and the second sheet portion 672 is substantially T-shaped. The second sheet portion 672 is disposed through an aperture 280 of the frame member 32 and into the interior region of the frame member 32. The first sheet portion 670 is disposed on the cooling plate 124. The second sheet portion 672 includes a first side 674 and a second side 676 disposed opposite to the first side 674. The battery cell 74 is disposed against the first side 674 within the interior region of the frame member 32. The battery cell 76 is disposed against the second side 676 within the interior region of the frame member 32. The cooling fin 116 transfers heat energy from the battery cells 74, 76 to the cooling plate 124.

The cooling fin 120 includes a first sheet portion 680 and a second sheet portion 682. The first sheet portion 680 is coupled to an end of the second sheet portion 682 and extends substantially perpendicular to the second sheet portion 682. A cross-sectional profile of the first sheet portion 680 and the second sheet portion 682 is substantially T-shaped. The second sheet portion 682 is disposed through an aperture 300 of the frame member 34 and into the interior region of the frame member 34. The first sheet portion 680 is disposed on the cooling plate 124. The second sheet portion 682 includes a first side 684 and a second side 686 disposed opposite to the first side 684. The battery cell 78 is disposed against the first side 684 within the interior region of the frame member 34. The battery cell 80 is disposed against the second side 686 within the interior region of the frame member 34. The cooling fin 120 transfers heat energy from the battery cells 78, 80 to the cooling plate 124.

Referring to FIGS. 1, 4, 9 and 10, the cooling plate 124 is provided to extract heat energy from the cooling fins 106-120 and from the battery cells 50-80. The first sheet portions of the cooling fins 106-120 are disposed on and against the cooling plate 124 and are thermally coupled to the cooling plate 124. Further, the cooling plate 124 is coupled to the cooling fins 106-120 proximate to lower ends of the housings of the battery cells 50-80 to effectively reduce the temperature level of the battery cells 50-80.

Figure 9:
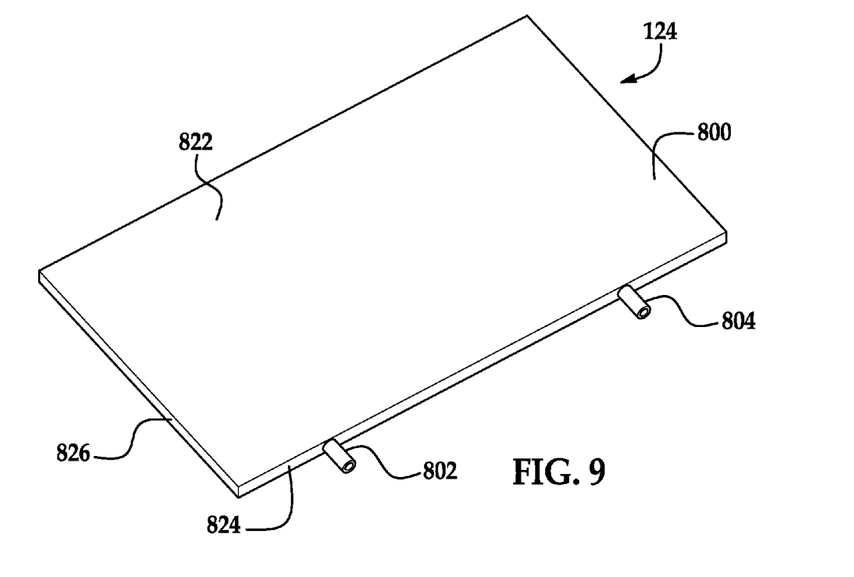
FIG. 9 is a schematic of a cooling plate utilized in the battery module of FIG. 1.
Figure 10:
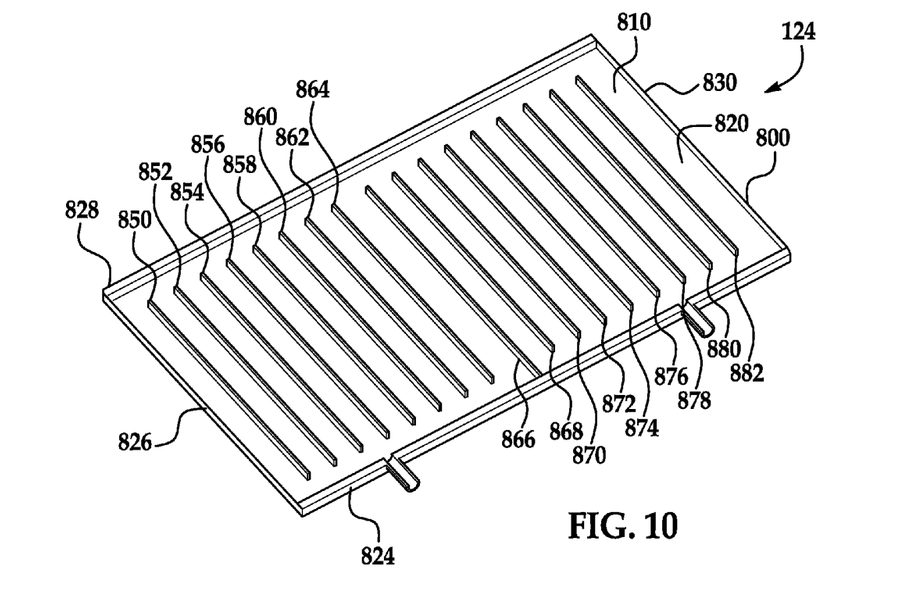
FIG. 10 is a cross-sectional schematic of a portion of the cooling plate of FIG. 9.

The cooling plate 124 includes a cooling plate housing 800, an inlet port 802, and an outlet port 804. The cooling plate housing 800 has an interior region 810 defining a flow path therethrough. The inlet port 802 and the outlet port 804 are coupled to the cooling plate housing 800 and fluidly communicate with the interior region 810 of the cooling plate housing 800.

The cooling plate housing 800 includes a bottom wall 820, a top wall 822, side walls 824, 826, 828, 830, and inner walls 850, 852, 854, 856, 858, 860, 862, 864, 866, 868, 870, 872, 874, 876, 878, 880, 882. The bottom wall 820 extends substantially parallel to the top wall 822. The side walls 824, 826, 828, 830 are coupled to and between the bottom wall 820 and the top wall 822 to define the interior region 810. The inner walls 850-882 are coupled between the bottom wall 820 and the top wall 822 and define the flow path in the interior region 810 from the inlet port 802 to the outlet port 804.

In an exemplary embodiment, during operation, an external coolant supply device pumps a coolant through the inlet port 802 which flows through the interior region 810 of the cooling plate housing 800 to the outlet port 804. Thereafter, the coolant exits the outlet port 804 and is routed back to the external coolant supply device. The cooling fins 106-120 conduct heat energy from the battery cells 50-80 to the cooling plate 124 which conducts the heat energy into the coolant flowing through the cooling plate 124. As a result, a temperature level of the battery cells 50-80 is reduced and maintained within a desired temperature range.

In an alternative embodiment, during operation, an external refrigerant supply device pumps a refrigerant through the inlet port 802 which flows through the interior region 810 of the cooling plate housing 800 to the outlet port 804. Thereafter, the refrigerant exits the outlet port 804 and is routed back to the external refrigerant supply device. The cooling fins 106-120 conduct heat energy from the battery cells 50-80 to the cooling plate 124 which conducts the heat energy into the refrigerant flowing through the cooling plate 124. As a result, a temperature level of the battery cells 50-80 is reduced and maintained within a desired temperature range.

Referring to FIGS. 1, 2, 4 and 6, the battery cells 50-80 are configured to generate operational voltages. In an exemplary embodiment, the battery cells 50-80 are electrically coupled in series utilizing the interconnect boards 100, 102. Since each of the battery cells 50-80 have an identical structure, only the structure of the battery cells 62, 64 will be described in great detail below.

Figure 6:
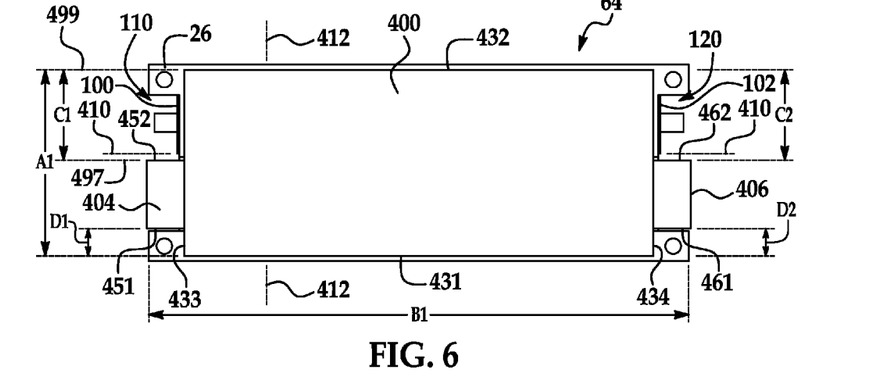
FIG. 6 is a side view of the battery module of FIG. 1 illustrating a battery cell and a frame member utilized in the battery module.
Figure 7:
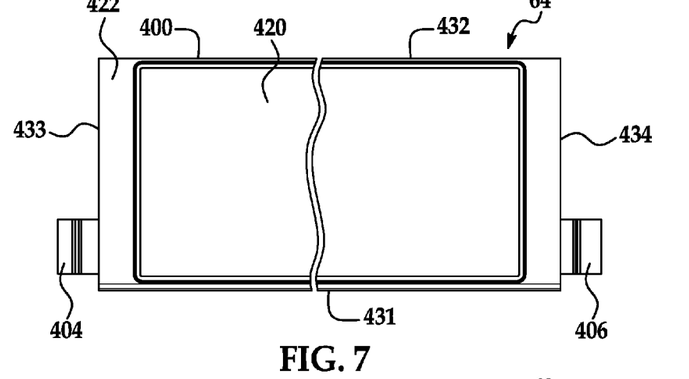
FIG. 7 is a more detailed view of the battery cell of FIG. 6.

Referring to FIGS. 6 and 7, the battery cell 64 is illustrated. The battery cell 64 includes a housing 400 and first and second electrical terminals 404, 406. The housing 400 is configured to hold an active material therein that is configured to generate an operational voltage on the first and second electrical terminals 404, 406. In an exemplary embodiment, the housing 400 is constructed of plastic and is a substantially rectangular-shaped pouch-type housing. The housing 400 extends longitudinally along a first axis 410 and vertically along a second axis 412. The second axis 412 is substantially perpendicular to the first axis 410. The housing 400 has a central body portion 420, a flange portion 422, a first end 431, a second end 432, a third end 433, and a fourth end 434. In an exemplary embodiment, the central body portion 420 holds a lithium-ion active material therein that is configured to generate a voltage between the first and second electrical terminals 404, 406. Also, the central body portion 420 is a substantially rectangular-shaped central body portion, and the flange portion 422 extends around a periphery of the substantially rectangular-shaped central body portion. The first and second ends 431, 432 extend substantially parallel to the first axis 410. The third and fourth ends 433, 434 extend substantially parallel to the second axis 412. A combined length (e.g., length B1) of the housing 400 and the electrical terminals 404, 406 in a direction parallel to the first axis 410 is at least two times larger than a length (e.g., a length A1) of the housing 400 in a direction parallel to the second axis 412.

The first electrical terminal 404 extends outwardly from the third end 433 of the housing 400 in a direction substantially parallel to the first axis 410. The first electrical terminal 404 has first and second edges 451, 452 extending substantially parallel to the first axis 410. The first edge 451 of the first electrical terminal 404 is disposed closer to the first end 431 of the housing 400 than the second edge 452 of the first electrical terminal 404.

A distance (e.g., a distance C1) from the second end 432 of the housing 400 to the second edge 452 of the first electrical terminal 404 is greater than a distance (e.g., a distance D1) from the first end 431 of the housing 400 to the first edge 451 of the first electrical terminal 404. For example, in an exemplary embodiment, the distance from the second end 452 of the housing 400 to the second edge 452 of the first electrical terminal 404 is at least two times greater than the distance from the first end 431 of the housing 400 to the first edge 451 of the first electrical terminal 404.

The second electrical terminal 406 extends outwardly from the fourth end 434 of the housing 400 in a direction substantially parallel to the first axis 410. The second electrical terminal 406 has first and second edges 461, 462 extending substantially parallel to the first axis 410. The first edge 461 of the second electrical terminal 406 is disposed closer to the first end 431 of the housing 400 than the second edge 462 of the second electrical terminal 406. Also, the first edge 461 of the second electrical terminal 406 extends substantially collinear with the first edge 451 of the first electrical terminal 404. Further, the second edge 462 of the second electrical terminal 406 extends substantially collinear with the second edge 452 of the first electrical terminal 404.

A distance (e.g., a distance C2) from the second end 432 of the housing 400 to the second edge 462 of the second electrical terminal 406 is greater than a distance (e.g., a distance D2) from the first end 431 of the housing 400 to the first edge 461 of the second electrical terminal 406. For example, in an exemplary embodiment, the distance from the second end 432 of the housing 400 to the second edge 462 of the second electrical terminal 406 is at least two times greater than the distance from the first end 431 of the housing 400 to the first edge 461 of the second electrical terminal 406.

Figure 8:
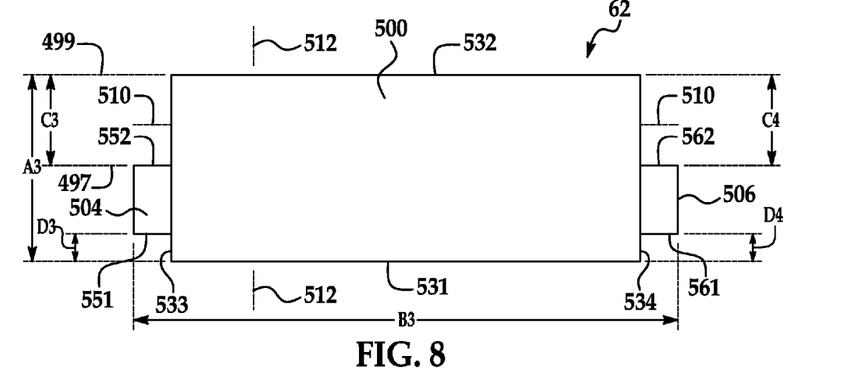
FIG. 8 is a side view of another battery cell utilized in the battery module of FIG. 1.

Referring to FIG. 8, the battery cell 62 is illustrated. The battery cell 62 includes a housing 500 and first and second electrical terminals 504, 506. The housing 500 is configured to hold an active material therein that is configured to generate an operational voltage on the first and second electrical terminals 504, 506. In an exemplary embodiment, the housing 500 is constructed of plastic and is a substantially rectangular-shaped pouch-type housing. The housing 500 extends longitudinally along a first axis 510 and vertically along a second axis 512. The second axis 512 is substantially perpendicular to the first axis 510. The housing 500 has a first end 531, a second end 532, a third end 533, and a fourth end 534. The first and second ends 531, 532 extend substantially parallel to the first axis 510. The third and fourth ends 533, 534 extend substantially parallel to the second axis 512. A combined length (e.g., length B3) of the housing 500 and the electrical terminals 504, 506 in a direction parallel to the first axis 510 is at least two times larger than a length (e.g., a length A3) of the housing 500 in a direction parallel to the second axis 512.

The first electrical terminal 504 extends outwardly from the third end 533 of the housing 500 in a direction substantially parallel to the first axis 510. The first electrical terminal 504 has first and second edges 551, 552 extending substantially parallel to the first axis 510. The first edge 551 of the first electrical terminal 504 is disposed closer to the first end 531 of the housing 500 than the second edge 552 of the first electrical terminal 504.

A distance (e.g., a distance C3) from the second end 532 of the housing 500 to the second edge 552 of the first electrical terminal 504 is greater than a distance (e.g., a distance D3) from the first end 531 of the housing 500 to the first edge 551 of the first electrical terminal 504. For example, in an exemplary embodiment, the distance from the second end 532 of the housing 500 to the second edge 552 of the first electrical terminal 504 is at least two times greater than the distance from the first end 531 of the housing 500 to the first edge 551 of the first electrical terminal 504.

The second electrical terminal 506 extends outwardly from the fourth end 534 of the housing 500 in a direction substantially parallel to the first axis 510. The second electrical terminal 506 has first and second edges 561, 562 extending substantially parallel to the first axis 510. The first edge 561 of the second electrical terminal 506 is disposed closer to the first end 531 of the housing 500 than the second edge 562 of the second electrical terminal 506. Also, the first edge 561 of the second electrical terminal 506 extends substantially collinear with the first edge 551 of the first electrical terminal 504. Further, the second edge 562 of the second electrical terminal 506 extends substantially collinear with the second edge 552 of the first electrical terminal 504.

A distance (e.g., a distance C4) from the second end 532 of the housing 500 to the second edge 562 of the second electrical terminal 506 is greater than a distance (e.g., a distance D4) from the first end 531 of the housing 500 to the first edge 561 of the second electrical terminal 506. For example, in an exemplary embodiment, the distance from the second end 532 of the housing 500 to the second edge 562 of the second electrical terminal 506 is at least two times greater than the distance from the first end 531 of the housing 500 to the first edge 561 of the second electrical terminal 406.

Referring to FIGS. 1 and 6-8, the second edges (e.g., top edges) of the first electrical terminals of the battery cells 50-80 are disposed co-planar with one another such that the first open region 110 is formed between a plane 497 (shown in FIG. 6) extending through the second edges of the first electrical terminals and a plane 499 (shown in FIG. 6) extending through the second ends (e.g., top ends) of the battery cells 50-80. For example, the second edge 452 of the first electrical terminal 404 of the battery cell 64 is disposed co-planar with the second edge 552 of the first electrical terminal 504 of the battery cell 62, such that the first open region 110 is formed between the plane 497 (shown in FIG. 6) extending through the second edges of the electrical terminals 404, 504 and the plane 499 (shown in FIG. 6) extending through the second ends of the battery cells 64, 62.

Further, the second edges (e.g., top edges) of the second electrical terminals of the battery cells 50-80 are disposed co-planar with one another such that the second open region 120 is formed between the plane 497 (shown in FIG. 6) extending through the second edges of the second electrical terminals and the plane 499 (shown in FIG. 6) extending through the second ends (e.g., top ends) of the battery cells 50-80. For example, the second edge 462 of the second electrical terminal 406 of the battery cell 64 is disposed co-planar with the second edge 562 of the second electrical terminal 506 of the battery cell 62, such that the second open region 120 is formed between the plane 497 (shown in FIG. 6) extending through the second edges of the electrical terminals 406, 506 and the plane 499 (shown in FIG. 6) extending through the second ends of the battery cells 64, 62.

The interconnect board 100 is coupled to the frame members in the first open region 110 and electrically couple the battery cells 50-80 to one another. In an exemplary embodiment, the interconnect board 100 electrically couples the battery cells 50-80 in series with one another. In another exemplary embodiment, the interconnect board 100 electrically couples the battery cells 50-80 in parallel with one another. Further, the interconnect board 100 may include a microprocessor which monitors operational parameters of the battery cells 50-80.

The interconnect board 102 is coupled to the frame members in the second open region 120 and electrically couple the battery cells 50-80 to one another. In an exemplary embodiment, the interconnect board 102 electrically couples the battery cells 50-80 in series with one another. In another exemplary embodiment, the interconnect board 102 electrically couples the battery cells 50-80 in parallel with one another. Further, the interconnect board 102 may include a microprocessor which monitors operational parameters of the battery cells 50-80.

The battery module described herein provides a substantial advantage over other battery modules. In particular, the battery module provides a technical effect of an improved placement of electrical terminals such that the battery module has open regions for receiving interconnect boards therein. Further, the battery module utilizes a cooling plate disposed proximate to electrical terminals of at least one battery cell in the battery module for improved heat dissipation from the battery module.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery module, comprising:
    a first battery cell having a first housing and first and second electrical terminals, the first housing being substantially rectangular-shaped and extending longitudinally along a first axis and vertically along a second axis; the second axis being substantially perpendicular to the first axis, the first housing having first, second, third and fourth ends, the first and second ends extending substantially parallel to the first axis, the third and fourth ends extending substantially parallel to the second axis; a combined length of the first housing and the first and second electrical terminals in a direction parallel to the first axis being at least two times larger than a length of the first housing in a direction parallel to the second axis; the first electrical terminal extending outwardly from the third end of the first housing in a direction substantially parallel to the first axis, the first electrical terminal having first and second edges extending substantially parallel to the first axis, the first edge of the first electrical terminal being disposed closer to the first end of the first housing than the second edge of the first electrical terminal; a distance from the second end of the first housing to the second edge of the first electrical terminal is greater than a distance from the first end of the first housing to the first edge of the first electrical terminal; the second electrical terminal extending outwardly from the fourth end of the first housing in a direction substantially parallel to the first axis, the second electrical terminal having first and second edges extending substantially parallel to the first axis, the first edge of the second electrical terminal being disposed closer to the first end of the first housing than the second edge of the second electrical terminal; a distance from the second end of the first housing to the second edge of the second electrical terminal is greater than a distance from the first end of the first housing to the first edge of the second electrical terminal;
    a cooling fin having a first side disposed adjacent to and against the first housing of the first battery cell; and
    a cooling plate coupled to the cooling fin proximate to the first end of the first housing such that the cooling plate cools the cooling fin to reduce a temperature level of the first battery cell.

2. The battery module of claim 1, wherein the cooling fin comprises first and second sheet portions, the first sheet portion being coupled to an end of the second sheet portion and extending substantially perpendicular to the first sheet portion.

3. The battery module of claim 2, wherein the second sheet portion being disposed adjacent to and against the first housing, and the first sheet portion being disposed adjacent to and against the cooling plate.

4. The battery module of claim 3, wherein the cooling plate includes a cooling plate housing, an inlet port, and an outlet port; the cooling plate housing having an interior region defining a flow path therethrough; the inlet port and the outlet port being coupled to the cooling plate housing and fluidly communicating with the interior region of the cooling plate housing.

5. The battery module of claim 1, wherein the first housing comprises a substantially rectangular-shaped pouch-type housing.

6. The battery module of claim 1, wherein the first edge of the first electrical terminal extends substantially collinear with the first edge of the second electrical terminal.

7. The battery module of claim 6, wherein the second edge of the first electrical terminal extends substantially collinear with the second edge of the second electrical terminal.

8. The battery module of claim 1, wherein the first housing comprises a substantially rectangular-shaped central body portion, and a flange portion that extends around a periphery of the substantially rectangular-shaped central body portion.

9. The battery module of claim 1, wherein the distance from the second end of the first housing to the second edge of the first electrical terminal is at least two times greater than the distance from the first end of the first housing to the first edge of the first electrical terminal.

10. The battery module of claim 1, wherein the distance from the second end of the first housing to the second edge of the second electrical terminal is at least two times greater than the distance from the first end of the first housing to the first edge of the second electrical terminal.

11. The battery module of claim 1, further comprising:
    a second battery cell having a second housing and third and fourth electrical terminals, the second housing being substantially rectangular-shaped and extending longitudinally along a third axis and vertically along a fourth axis; the fourth axis being substantially perpendicular to the third axis, the second housing having first, second, third and fourth ends, the first and second ends of the second housing extending substantially parallel to the third axis, the third and fourth ends extending substantially parallel to the fourth axis; a combined length of the second housing and the third and fourth electrical terminals in a direction parallel to the third axis being at least two times larger than a length of the second housing in a direction parallel to the fourth axis;
    the third electrical terminal extending outwardly from the third end of the second housing in a direction substantially parallel to the third axis, the third electrical terminal having first and second edges extending substantially parallel to the third axis, the first edge of the third electrical terminal being disposed closer to the first end of the second housing than the second edge of the third electrical terminal;

a distance from the second end of the second housing to the second edge of the third electrical terminal is greater than a distance from the first end of the second housing to the first edge of the third electrical terminal;

the fourth electrical terminal extending outwardly from the fourth end of the second housing in a direction substantially parallel to the third axis, the fourth electrical terminal having first and second edges extending substantially parallel to the third axis, the first edge of the fourth electrical terminal being disposed closer to the first end of the second housing than the second edge of the fourth electrical terminal; and a distance from the second end of the second housing to the second edge of the fourth electrical terminal is greater than a distance from the first end of the second housing to the first edge of the fourth electrical terminal; and the cooling fin having a second side disposed adjacent to and against the second housing of the second battery cell.

12. The battery module of claim 11, wherein the second edge of the first electrical terminal of the first battery cell is disposed co-planar with the second edge of the third electrical terminal of the second battery cell, such that a first open region is formed between the first and third electrical terminals and the respective second ends of the first and second battery cells.

13. The battery module of claim 12, wherein a portion of an interconnect board is disposed in the first open region.

14. The battery module of claim 13, wherein the second edge of the second electrical terminal of the first battery cell is disposed co-planar with the second edge of the fourth electrical terminal of the second battery cell, such that a second open region is formed between the second and fourth electrical terminals and the respective second ends of the first and second battery cells.

* * * * *